United States Patent
Meitzler et al.

(10) Patent No.: US 6,424,736 B1
(45) Date of Patent: Jul. 23, 2002

(54) FUZZY LOGIC TECHNIQUE TO DETERMINE SEARCH TIME AND PROBABILITY OF DETECTION FOR TARGETS OF INTEREST IN BACKGROUND SCENES

(75) Inventors: Thomas J. Meitzler, Troy; Harpreet Singh, Detroit; Euijung Sohn, Walled Lake, all of MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/332,251

(22) Filed: May 24, 1999

(51) Int. Cl.[7] ................................................ G06K 9/62
(52) U.S. Cl. .................... 382/155; 382/103; 382/106; 382/159; 382/228; 701/27; 706/1; 706/9; 706/45; 706/905
(58) Field of Search ............................... 382/103, 106, 382/155, 159, 181, 224, 228; 706/1, 2, 9, 45, 900, 905; 701/27

(56) References Cited
U.S. PATENT DOCUMENTS 5,671,140 A * 9/1997 Bessacini et al. ............. 701/27
5,867,386 A * 2/1999 Hoffberg et al. ............ 382/190
RE36,280 E * 8/1999 Kawabata et al. ........... 165/142

* cited by examiner

Primary Examiner—Leo Boudreau
Assistant Examiner—Sheela Chawan
(74) Attorney, Agent, or Firm—David L. Kuhn; Clifford C. Carter; Gail S. Soderling (57) ABSTRACT

A method of determining the visibility of a target in a background uses search time as the output. A set of images of the target in the background is made, and selected input variables in each image are measured. The input variables relate to target size, target juxtaposition relative to the viewer's location, luminance of the target and luminance of the background scene. One version of our method additionally uses wavelet edge points as an input variable. Each input variable, as well as the output variable, has several applicable membership functions by which membership values are assigned to the variables. Choosing membership functions for variables is done by fuzzy rules. Applying the fuzzy rules and membership functions produces multiple values for the output variable. These values are defuzzified to obtain a crisp end result. This result can disqualify proposed target designs or to help select among several good designs of the target.

5 Claims, 8 Drawing Sheets

FUZZY RULE TABLE

← STATUS OF INPUT VARIABLES →

| RULE NO | DISTANCE | ASPECT | VERT-TAR-EXT | AREA-TAR-EXT | LUM-SCENE | LUM-TAR | LUM-SURR | SEARCH TIME |
|---|---|---|---|---|---|---|---|---|
| 1 | mf4a | mf4b | mf1c | mf2d | mf2e | mf3f | mf3g | mf6h |
| 2 | mf4a | mf4b | mf2c | mf2d | mf4e | mf3f | mf3g | mf6h |
| 3 | mf3a | mf1b | mf1c | mf1d | mf2e | mf1f | mf3g | mf4h |
| 4 | mf1a | mf5b | mf4c | mf1d | mf1e | mf1f | mf4g | mf2h |
| 5 | mf4a | mf4b | mf1c | mf2d | mf4e | mf3f | mf3g | mf5h |
| 6 | mf2a | mf5b | mf2c | mf4d | mf1e | mf2f | mf2g | mf3h |
| 7 | mf3a | mf3b | mf2c | mf3d | mf3e | mf2f | mf1g | mf1h |
| 8 | mf2a | mf5b | mf2c | mf3d | mf3e | mf5f | mf3g | mf3h |
| 9 | mf1a | mf1b | mf3c | mf5d | mf5e | mf3f | mf5g | mf6h |
| 10 | mf4a | mf1b | mf1c | mf1d | mf3e | mf3f | mf3g | mf6h |
| 11 | mf5a | mf5b | mf1c | mf1d | mf4e | mf2f | mf2g | mf5h |
| 12 | mf4a | mf3b | mf1c | mf2d | mf3e | mf2f | mf4g | mf4h |
| 13 | mf2a | mf5b | mf2c | mf2d | mf2e | mf3f | mf3g | mf4h |
| 14 | mf4a | mf5b | mf1c | mf1d | mf3e | mf2f | mf2g | mf5h |
| 15 | mf3a | mf1b | mf1c | mf2d | mf3e | mf3f | mf3g | mf3h |
| 16 | mf4a | mf5b | mf5c | mf7d | mf4e | mf4f | mf2g | mf2h |
| 17 | mf3a | mf3b | mf3c | mf6d | mf3e | m3f | mf3g | mf1h |
| 18 | mf1a | mf5b | mf1c | mf1d | mf3e | mf1f | mf3g | mf2h |
| 19 | mf4a | mf1b | mf1c | mf2d | mf4e | mf4f | mf4g | mf5h |
| 20 | mf4a | mf5b | mf2c | mf4d | mf4e | mf2d | mf3g | mf2h |
| 21 | mf2a | mf4b | mf2c | mf6d | mf3e | mf2d | mf4g | mf2h |
| 22 | mf5a | mf1b | mf2c | mf3d | mf4e | mf2d | mf5g | mf3h |

FUZZY RULE TABLE

─── STATUS OF INPUT VARIABLES ───

| RULE NO | DISTANCE | ASPECT | VERT-TAR-EXT | AREA-TAR-EXT | LUM-SCENE | LUM-TAR | LUM-SURR | EDGEPOINT | SEARCH TIME |
|---|---|---|---|---|---|---|---|---|---|
| 1 | mf2a | mf3b | mf1c | mf1d | mf3e | mf1f | mf2g | mf2i | mf4j |
| 2 | mf3a | mf1b | mf1c | mf1d | mf2e | mf2f | mf2g | mf2i | mf6j |
| 3 | mf1a | mf2b | mf3c | mf3d | mf3e | mf1f | mf3g | mf2i | mf1j |
| 4 | mf2a | mf1b | mf1c | mf1d | mf2e | mf1f | mf2g | mf1i | mf3j |
| 5 | mf1a | mf3b | mf3c | mf3d | mf1e | mf1f | mf3g | mf4i | mf1j |
| 6 | mf1a | mf3b | mf1c | mf1d | mf1e | mf2f | mf1g | mf1i | mf1j |
| 7 | mf1a | mf3b | mf2c | mf1d | mf3e | mf1f | mf2g | mf2i | mf2j |
| 8 | mf2a | mf1b | mf1c | mf1d | mf3e | mf2f | mf2g | mf3i | mf3j |
| 9 | mf2a | mf2b | mf2c | mf1d | mf2e | mf2f | mf1g | mf1i | mf1j |
| 10 | mf1a | mf1b | mf1c | mf1d | mf1e | mf1f | mf1g | mf1i | mf3j |
| 11 | mf2a | mf1b | mf1c | mf1d | mf2e | mf3f | mf3g | mf3i | mf4j |
| 12 | mf3a | mf3b | mf1c | mf1d | mf3e | mf4f | mf4g | mf2i | mf5j |
| 13 | mf1a | mf3b | mf2c | mf2d | mf2e | mf2f | mf2g | mf4i | mf2j |
| 14 | mf2a | mf3b | mf1c | mf1d | mf2e | mf2f | mf2g | mf1i | mf2j |
| 15 | mf2a | mf1b | mf2c | mf1d | mf3e | mf3f | mf3g | mf1i | mf2j |
| 16 | mf2a | mf3b | mf3c | mf3d | mf3e | mf2f | mf2g | mf2i | mf1j |
| 17 | mf1a | mf1b | mf3c | mf1d | mf2e | mf2f | mf2g | mf1i | mf4j |
| 18 | mf2a | mf3b | mf1c | mf1d | mf2e | mf2f | mf1g | mf2i | mf2j |
| 19 | mf1a | mf1b | mf2c | mf1d | mf3e | mf1f | mf2g | mf1i | mf1j |
| 20 | mf2a | mf1b | mf1c | mf1d | mf2e | mf1f | mf3g | mf2i | mf1j |
| 21 | mf3a | mf3b | mf1c | mf1d | mf2e | mf3f | mf3g | mf2i | mf3j |
| 22 | mf1a | mf3b | mf3c | mf2d | mf2e | mf1f | mf3g | mf2i | mf1j |

Fig. 15

FUZZY LOGIC TECHNIQUE TO DETERMINE SEARCH TIME AND PROBABILITY OF DETECTION FOR TARGETS OF INTEREST IN BACKGROUND SCENES

GOVERNMENT USE

The invention described here may be made, used and licensed by or for the U.S. Government for governmental purposes without paying us any royalty.

BACKGROUND

Extensive research has been performed on the visibility of objects in visual scenes and in infrared scenes of interest wherein the intent is to determine the probability that the object will be detected or to determine the amount of search time needed to do so. A 1995 doctoral thesis by one of the inventors herein discusses much of the research work known at that time. This thesis is "Modem Approaches to Computation of the Probability of Target Detection in Cluttered Environments" by Thomas J. Meitzler. The thesis proposed that a fuzzy logic approach could be employed in a method of calculating the probability of detecting targets using various field parameters and target metrics that included clutter metrics as input variables. Subsequent to the thesis, a patent application was filed which has resulted in a continuation application now before the US Patent Office. The continuation application is entitled "Method of Determining Probability of Target Detection in a Visually Cluttered Scene," has Ser. No. 09/006,529, was filed on Jan. 13, 1998, and has two of the same inventors as the instant application. The parent application has the same title, lists Thomas J. Meitzler as the sole inventor, is now abandoned, had Ser. No. 08/614,087 and was filed Mar. 13, 1996. These prior applications related to predicting target detection but did not relate to the use of fuzzy logic approaches in doing so.

Meanwhile the inventors continued their work in fuzzy logic approaches to the study of target detection. As this work began, there was no certainty that a fuzzy logic approach could successfully be reduced to practice, but by September or October of 1998, a fuzzy logic approach had been sufficiently refined to be practical. Even further refinement was subsequently accomplished by the addition of a new input variable, which is the number of wavelet edge points in the scenes. As the work evolved papers were published which were co-authored by one or more of the inventors. These papers related to the use of fuzzy logic to predict either the probability of target detection or the amount of search time required to detect a target in a visual or infrared scene. These papers included the following publications.

1. "Fuzzy Logic Approach for Computing the Probability of Target Detection in Cluttered Scenes" by Thomas J. Meitzler, Labib Arefeh, Harpreet Singh and Grant R. Gerhart; *Optical Engineering.* 35(12) 3623–3636 (December 1996).

2. "Predicting the Probability of Target Detection in Static Infrared and Visual Scenes using the Fuzzy Logic Approach" by Thomas J. Meitzler, Harpreet Singh, Labib Arefeh, Euijung Sohn and Grant R. Gerhart: *Optical Engineering.* 37(1) 10–17 (January 1998).

3. "A Perception Test of Infrared Images of Soldiers in Camouflaged Uniforms" by Thomas J. Meitzler, Darin Ellis, Euijung Sohn, Darryl Bryk, Kathy Rock and Harpreet Singh; Proceedings of the SPIE's 12th Annual International Symposium on Aerospace Defense Sensing Simulation and Controls, Targets and Backgrounds Characterization & Representation IV, Vol. 3375, April 1998.

4. "Computing the Probability of Target Detection in Dynamic Visual Scenes Containing Clutter Using the Fuzzy Logic Approach" by Thomas J. Meitzler, Euijung Sohn, Daryl Bryk, R. Kistner and D. Bednarz; Optical Engineering, Vol. 37(7) 1998.

SUMMARY

Our invention is a method of determining the visibility of a target in a visual or infrared background scene where the target's visibility is a key design issue. Search time is the output variable used to gauge target detectability, and search time is an indicator of the probability of detecting the target in the background. We use a set of images of the target in the background scene and measure selected input variables in each image. The input variables relate to target size, target juxtaposition relative to the viewer's location, luminance of the target, and luminance of the background scene. Each input variable, as well as the output variable, is associated with its own set of empirically developed membership functions. These membership functions assign membership values to the variables. The choice of membership function for each variable is controlled by specially tailored fuzzy rules which always apply. Applying the fuzzy rules and membership functions results in a collection of values for the output variable which are subjected to a defuzzification, typically by centroid averaging. Defuzzification obtains a crisp value usable, among other things, to disqualify proposed target designs or to select among several qualified target designs.

DETAILED DESCRIPTION

Figure 1:
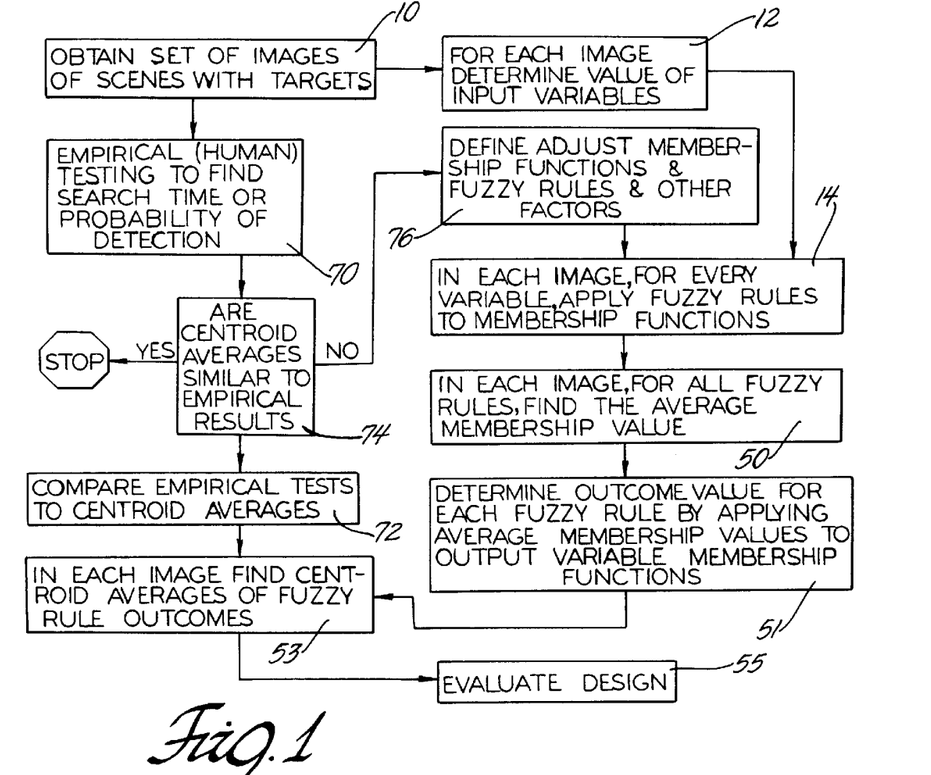
FIG. 1 is a flow chart that generally describes our method and the process by which we refined our method.

In FIG. 1 is shown a flow chart that gives an overview of our process to determine detection times for selected targets in scenes of interest. The first step, 10, obtaining images of scenes with targets, can be accomplished in a variety of ways. Typically a set of scenes are all photographs of the same target, such as a military vehicle like an armored personnel carrier or a HMMWV (High Mobility Multipurpose Wheeled Vehicle). The background will normally be real outdoor locations similar to those expected in a combat zone. Scenes can also be artificially constructed using graphics or video processing techniques.

After step 10 is a second step 12 wherein a common set of seven input variables are determined or measured for each image. These input variables are labeled as Distance, Aspect, Vert-tar-ext, Area-tar-ext, Lum-scene Lum-tar and Lum-surr. "Distance" is simply the distance, in meters for our description herein, as measured from a camera to the target. The camera is typically an infrared camera, but can be a camera operative in a visible light range, or a combination of camera types.

"Aspect " is the angular position of the target relative to the camera or human observer. We use the absolute value of the sine of the angle between the line along which the target faces and the line of sight from the camera to the target. Thus the sine is 0 if the target faces directly toward or away from the camera and is 1 if the target faces normal to the line of sight. "Vert-tar-ext" is the height of the target in terms of pixels. "Area-tar-ext" is the area of the target's silhouette from the sensor's or viewer's vantage point, using pixels as the units of area measure. "Lum-scene" is the average luminance, in candela per square meter ($cd/m^2$) of the overall scene depicted by the image. "Lum-tar" is similarly the luminance of the target and "Lum-surr" is the average luminance in the vicinity of the target. Vicinity, as we use that term, means an area including and surrounding the target, this area being equal to twice the "area-tar-ext" silhouette area. Each luminance variable is measured or determined in conventional fashion. For example, the appropriate light metering equipment, such as a spectraphotometer can be used when photographing a target in a given background. Alternatively, the luminance of the target and background can be directly controlled during graphic construction of a scene.

Figure 2:
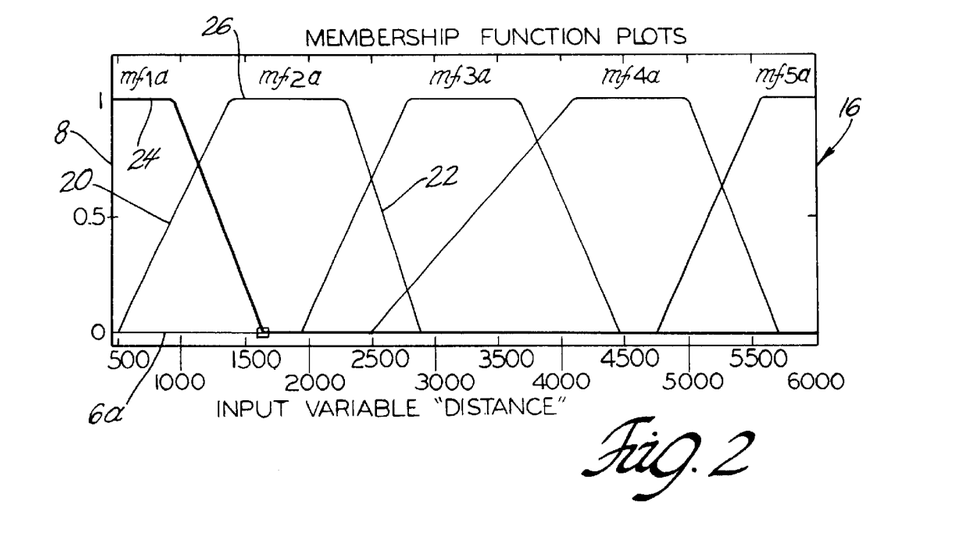
FIG. 2 is a graph of the membership functions for the input variable, "Distance."
Figure 3:
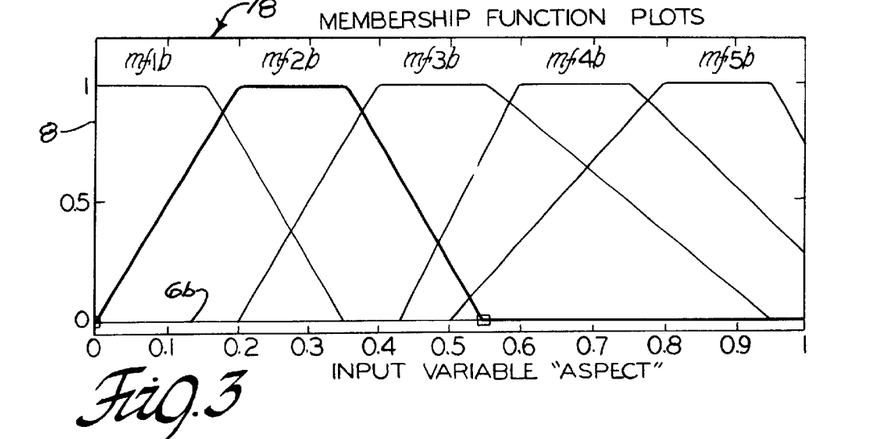
FIG. 3 is a graph of the membership functions for the input variable, "Aspect."
Figure 5:
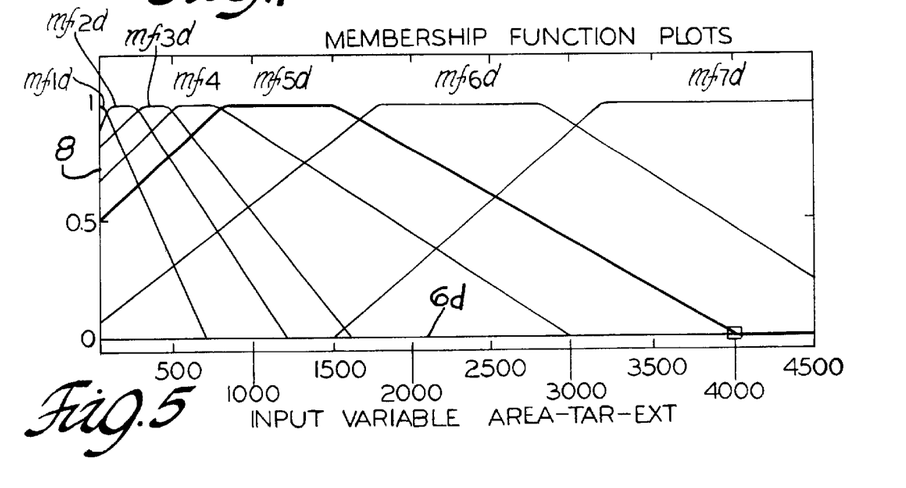
FIG. 5 is a graph of the membership functions for the input variable, "Area-tarext," a measure of target area.
Figure 6:
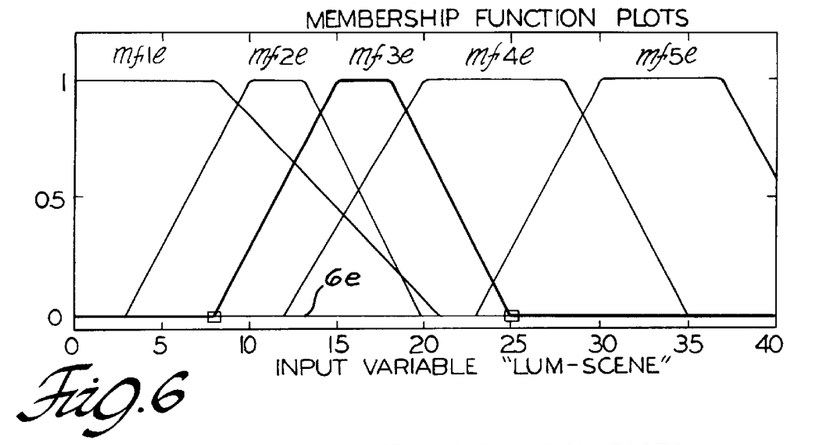
FIG. 6 is a graph of the membership functions for the input variable, "Lum-scene," a measure of overall luminance in an image.
Figure 7:
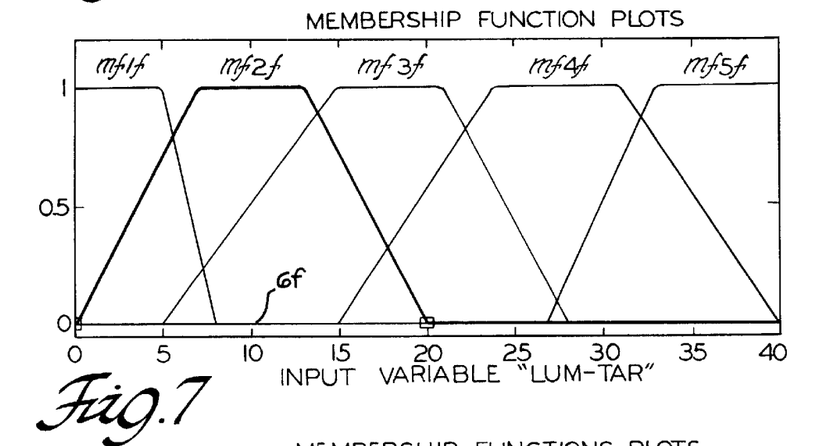
FIG. 7 is a graph of the membership functions for the input variable, "Lum-tar," a measure of target luminance.
Figure 8:
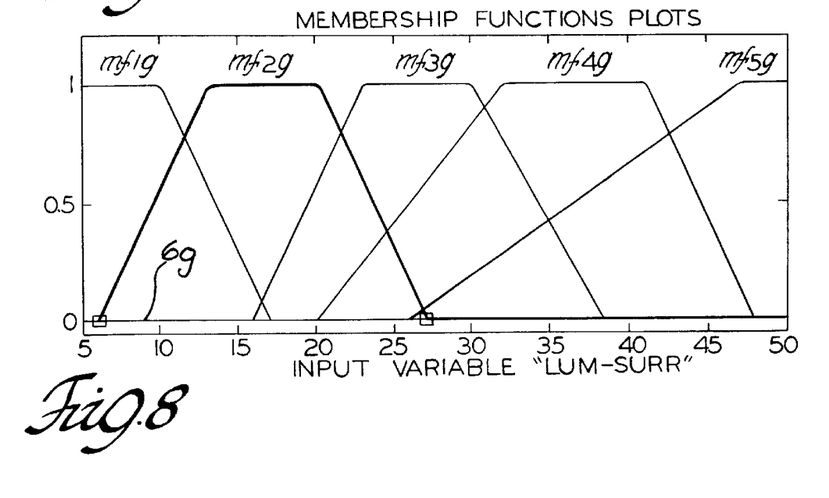
FIG. 8 is a graph of the membership functions for the input variable, "Lum-surr," a measure of luminance of the target and immediately surrounding area.

Each of the aforementioned input variables is associated with its own set of membership functions. The set of membership functions for "Distance" is shown in FIG. 2, for "Aspect" in FIG. 3, for "Vert-tar-ext" in FIG. 4, for "Area-tar-ext" in FIG. 5, for "Lum-scene" in FIG. 6, for "Lum-tar" in FIG. 7, and for "Lum-surr" in FIG. 8. Each membership function in these figures associates a value for an input variable with a weighting factor, or membership value. The membership values are between 0 and 1 on the vertical scales 8 in each Figure. The membership functions as shown in the figures are proportionately correct. That is, for any value of an input variable along the horizontal scale in each figure, the associated membership value or values can be accurately determined by using the graphs in the figures.

The sets of membership functions shown graphically in FIGS. 2 through 8 have common features. First, in each set, all the membership functions have the same domain, from a given input variable's minimum to that input variable's maximum. Thus, for example, in FIG. 2 for graph 16 for the input variable "Distance," each membership function has a range from 500 meters to 6000 meters. Likewise in graph 18 (FIG. 3) of the input variable "Aspect," each membership function has a range from 0 to 1. It will be understood that the nonzero portions of the membership functions do have different ranges.

A second common feature of the sets of membership functions is the trapezoidal shape of the nonzero graphical portions of the functions. For the "Distance" input variable in FIG. 2, the first membership function mf1a has a nonzero portion within the 500 m to 6000 m domain. That nonzero portion delimits a trapezoidal space with horizontal scale line 6a and vertical scale line 8. The nonzero portion of function mf1a may be regarded as a trapezoid having one vertical side. In like fashion, last membership function mf5a within the domain borders a trapezoidal area and is a trapezoid with one vertical side.

Again referring to FIG. 2, the intermediate membership functions mf2a, mf3a and mf4a all define trapezoids with horizontal scale line 6a. The same is true for all of the intermediate membership functions in FIGS. 3 through 8. Additionally, all of the intermediate membership functions have a left side whose slope is positive and a right side whose slope is negative, the left and right sides of an intermediate function being exemplified respectively at reference numerals 20 and 22 of function mf2a in FIG. 2.

All the trapezoidal membership functions, no matter what input variable they relate to, have another common feature, which is a top line or apex that is shorter than the base of the trapezoid of which they are part. Such apexes are exemplified by those shown at 24 and 26 in FIG. 2.

Figure 9:
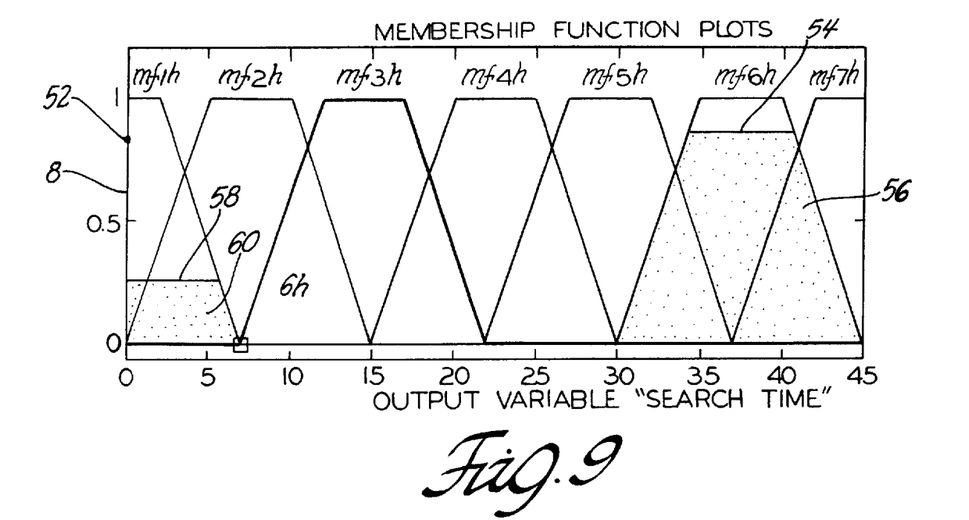
FIG. 9 is a graph of the membership functions for the output variable, "Search-Time," a measured time required to find the target in a scene.

It should be noted here that the membership functions for the output variable have the same general characteristics as the membership functions for the input variables. Specifically, the membership functions for the output variable "Search-Time" in FIG. 9 are generally like the membership functions for the input variables shown in FIGS. 2 through 8. Hence, all of the membership functions in FIG. 9 (mf1h through mf7h) are proportionally correct and all have the same range, from the minimum of zero to the maximum of 45 seconds. The nonzero portions of the FIG. 9 membership functions have a trapezoidal shape and the intermediate membership functions (mf2h through mf6h) have positive slopes on their left sides and negative slopes on their right sides. The FIG. 9 membership functions have a horizontal top or apex, which is shorter than the base of the trapezoidal shape, just like their counterparts in FIGS. 2 through 8.

Figure 11:
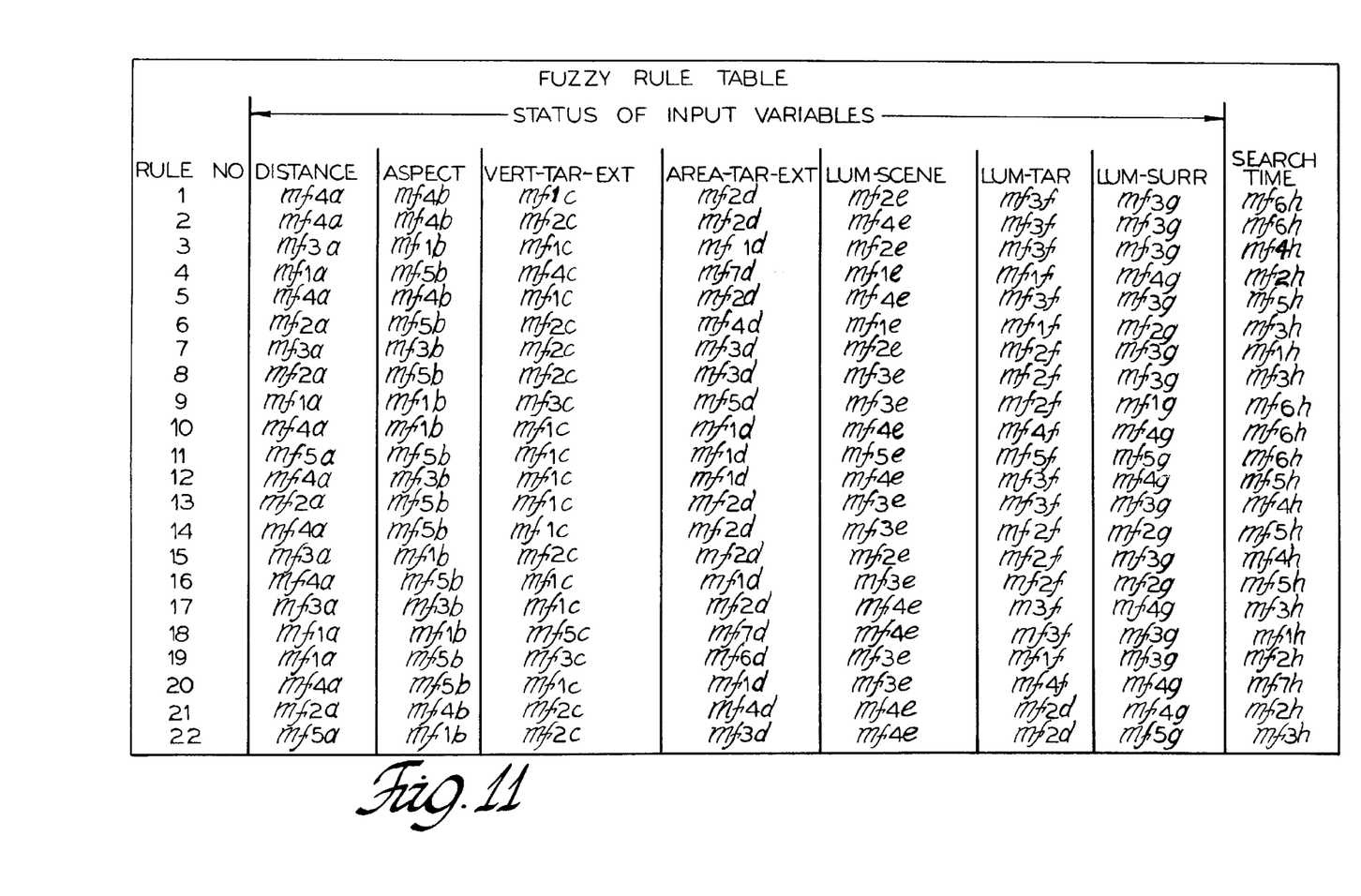
FIG. 11 is a table listing the membership functions used for each variable for the fuzzy rules of our method.

Referring again to FIG. 1, the next basic step in determining search time is the application of our fuzzy rules to the membership functions, as shown at reference numeral 14 of the figure. That is, for every image, and for all input variables in each image, the fuzzy rules are applied to the membership functions. We are momentarily ignoring certain steps (70, 72, 74 and 76) in FIG. 1 that lead to step 14; these steps relate only to the process of perfecting our method and are not part of the method itself. The fuzzy rules are explained in conjunction with FIG. 11, the Fuzzy Rule Table, which lists what membership function applies for each input variable for a given rule. In fuzzy rule 1, for example, membership function mf4a applies to distance, membership function mf4b applies to aspect, membership function mf1c applies to vert-tar-ext, membership function mf2d applies to area-tar-ext, membership function mf2e applies to lum-scene, membership function mf3f applies to lum-tar, and membership function mf3g applies to lum-surr. As to the output variable in fuzzy rule 1, the membership function mf6h is applied to search time. Fuzzy rules 2 through 22 are applied similarly, all 22 of the fuzzy rules being applied to each image.

Figure 4:
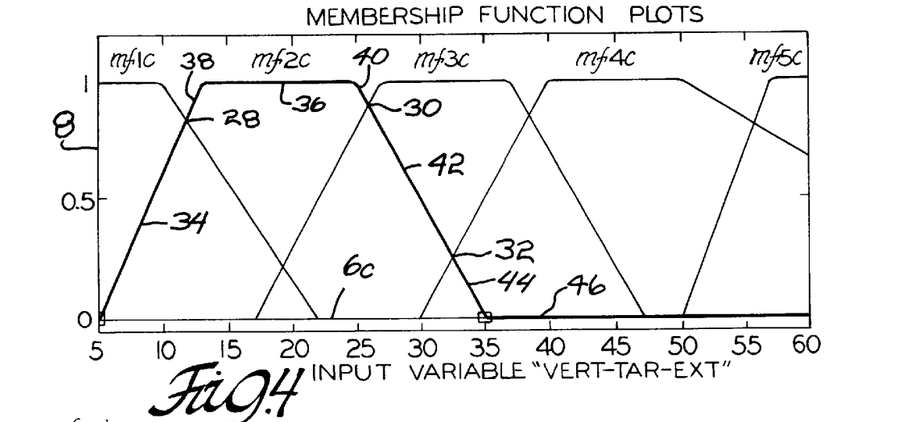
FIG. 4 is a graph of the membership functions for the input variable, "Vert-tarext," a measure of target height.

Inherent in application of the fuzzy rules is the particular operation of the membership functions to associate a membership value to an input variable. Membership function mf2c will be used to illustrate how this is done. Referring now to FIG. 4, membership function mf2c is more boldly lined than the other membership functions. Membership function mf2c intersects membership function mf1c at point 28, intersects membership function mf3c at point 30, and intersects membership function mf4c at point 32. The respective values of vert-tar-ext for points 28, 30 and 32 are approximately 11.6, 26.0 and 32.5. The respective associated membership values along vertical scale 8 for points 28, 30 and 32 are approximately 0.86, 0.91 and 0.25.

In our method, entire segments of the membership functions have common membership values on scale 8. Thus membership function mf2c has a first segment 34 between vertical scale 8 and point 28, for values of vert-tar-ext from 5 to 11.6, wherein all points on the segment have the same membership value as point 28, which is 0.86. Membership function mf2c has a horizontal segment or apex 36 for which the associated value on scale 8 is 1.00. Segment 38 of membership function mf2c connects point 28 to apex 36 and segment 40 connects apex 36 to point 30. All points on segments 38 and 40 have the same membership value on scale 8 as apex 36. Thus for values of vert-tar-ext greater than 11.6 but less than 32.5, the membership value on scale 8 will be 1.00. Segment 42 connects points 30 and 32 of membership function mf2c and includes values of vert-tar-ext equal to or greater than 26.0 but less than 32.5. The membership value on scale 8 for all points on segment 42 is 0.91, which is also the associated value for point 30. Segment 44 of membership function mf2c connects point 32 to horizontal base segment 46. The values of vert-tar-ext for segment 44 include all values equal to or greater than 32.5 but less than 35. The membership value on scale 8 for segment 44 is 0.25, which is also the associated value for point 32. Base horizontal segment 46 lies along horizontal scale line 6c and includes all values of vert-tar-ext from 35.0 to 60.0 and its associated value on vertical scale 8 is zero.

The foregoing method by which membership values on vertical scale 8 are associated with values of membership function mf2c applies to all of the membership functions for any of the input variables. Accordingly, for all non-horizontal, sloped segments of any given membership function, one follows the segment upward, toward the function's apex, until a point is encountered where the given membership function intersects with another membership function; one does this whether the segment has a positive or negative slope. The membership value on scale 8 for the point of intersection is the membership value for the entire segment. If no point of intersection with another membership function is encountered, then the segment will terminate a junction with the apex of the given membership function. The membership value on vertical scale 8 for the segment will then be 1.00, the same membership value that the apex has. For the segment of a given membership function that is the apex, the membership value will always be 1.00. For base horizontal segments of the given membership function the associated value will always be zero.

Each of the fuzzy rules creates a set of 7 membership values, one membership value for each input variable. For each fuzzy rule, the 7 membership values are averaged, as indicated by step 50 in FIG. 1. The resulting average membership values are then applied to the appropriate output variable membership functions shown in FIG. 9. This operation is as represented by step 51 of FIG. 1.

As an example, let the average membership value for fuzzy rule 1 be 0.86. This average membership value will be applied to membership function mf6h in FIG. 9, where point 52 is at 0.86 on vertical scale 8 and line 54 is a set of points beneath membership function mf6h where the membership value is 0.86. The result of applying this average membership value 0.86 to membership function mf6h is the trapezoidal area of that membership function which is beneath line 54, and which is shaded area 56 in FIG. 9. As another example, when the average membership value for fuzzy rule 7 is 0.26, this value will be applied to membership function mf1h so as to obtain an area 60 (shaded in FIG. 9) below that membership function and also below line 58, where the membership value is 0.26.

Figure 10:
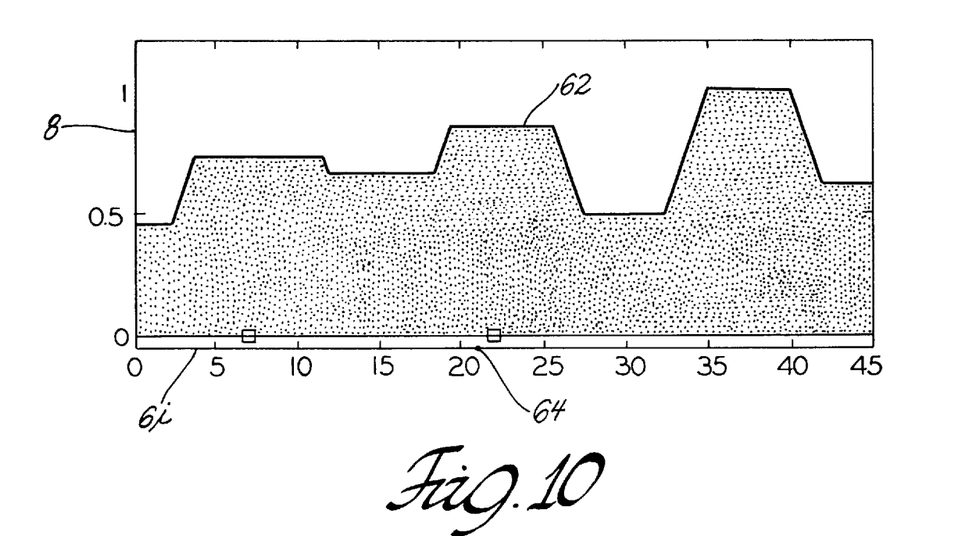
FIG. 10 is a graphic representation of a union of output variable values typically used in defuzzification.

The outcome from application of the fuzzy rules must be defuzzified. To do so, we prefer to use a centroid averaging according to step 53 of FIG. 1, although other defuzzzification techniques can be used. To apply the centroid averaging technique, it is first observed that application of all 22 fuzzy rules to an image will result in 22 of the areas described above. The union, as opposed to the sum, of these areas is determined, the result of the union being a conglomerate area typified by polygonal area 62 in FIG. 10. Next, the centroid, or geometric center of the conglomerate area is determined, and an associated point 64 on scale 6 in FIG. 10 directly below the centroid also will be determined. The value on scale 6i corresponding to the associated point is a crisp value, a definitized outcome from the application of the fuzzy rules. The value at point 64 is approximately 21 seconds.

Once crisp values have been determined from a set of images, it is possible to evaluate the design of the target in the images. For example, if the target is a soldier wearing a certain camouflage pattern in a forest background, then the search times for the images will be used to choose an optimum camouflage pattern, one that takes the maximum search time. On the other hand the target could be a warning label on a piece of machinery, wherein a label having the minimum search time would be chosen. Design evaluation is step 55 in FIG. 1.

In FIG. 1, steps 10, 12, 14, 50 51 53 and 55 generally describe our fuzzy logic technique. The addition of steps 70, 72 74 and 76 to FIG. 1 results in a depiction of the iterative process by which the technique was developed. During the development process, we created and experimented with numerous factors, such as: input variables, membership function shapes, membership function ranges, methods of membership rule application, fuzzy rules, and defuzzification techniques. In step 70, the images tested by the fuzzy logic technique are also empirically tested, using human subjects. In step 72, the results of empirical testing are compared to the results of a given iteration of the fuzzy logic technique. Step 74 is the decision to stop the technique's development when the technique's results are sufficiently close to empirical results. We deemed a correlation factor in the 0.9 range to be sufficient to consider our method practical useful. If the technique's results are not sufficiently close, then the next step is step 76, wherein the aforementioned factors are varied and the technique is tried again.

Although we deemed our method as described thus far to be practical, we have continued attempts to refine it further. One such attempt is the addition of another input variable, which is the number wavelet edge points in a scene as computed by filtering the scene via wavelet transform functions. In conjunction with the wavelet edge point variable, it is important to note that the image size is held constant so that the height, width and number of pixels for each scene is constant. We believe that using the new input variable may improve the results of our method and we describe that variable and its use now. A discussion of the use of wavelets or wavelet transform filtering is found in the Meitzler doctoral thesis referenced in the Background portion of this specification.

Figure 12:
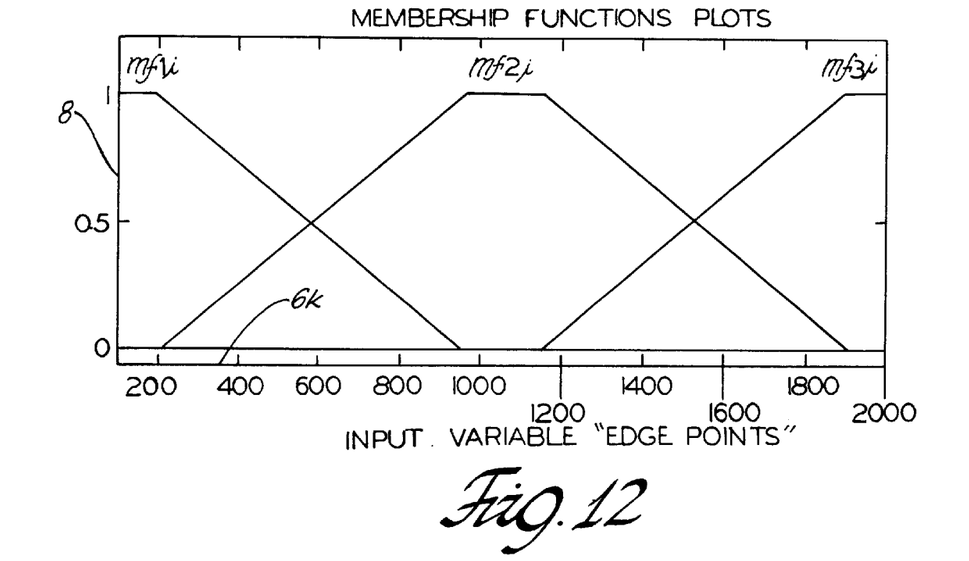
FIG. 12 is a graph of the membership functions for the input variable, "Wavelet edge points" used in a preferred alternate of our method.
Figure 13:
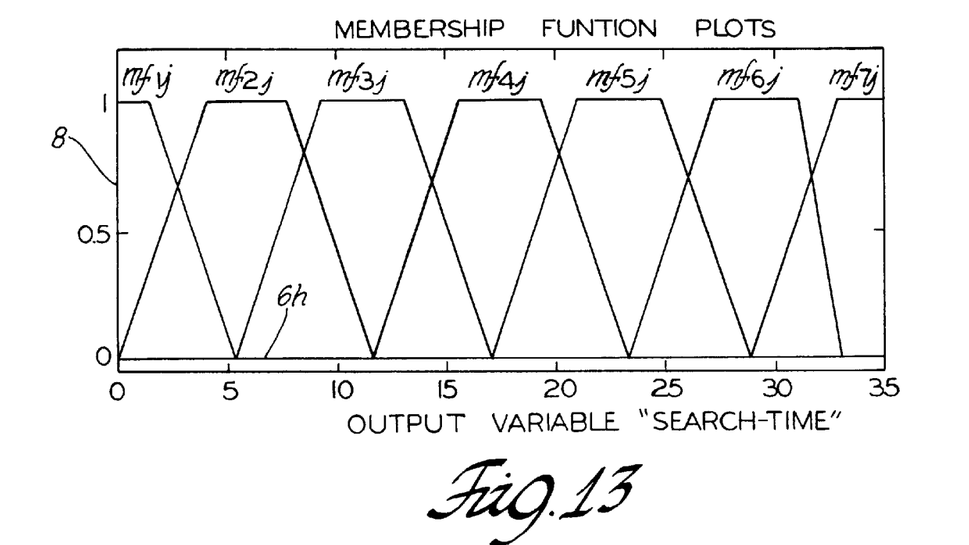
FIG. 13 is a graph of the membership functions for the output variable, "SearchTime," used when the "Wavelet edge points" input variable is used in addition to the other input variables.
Figure 15:
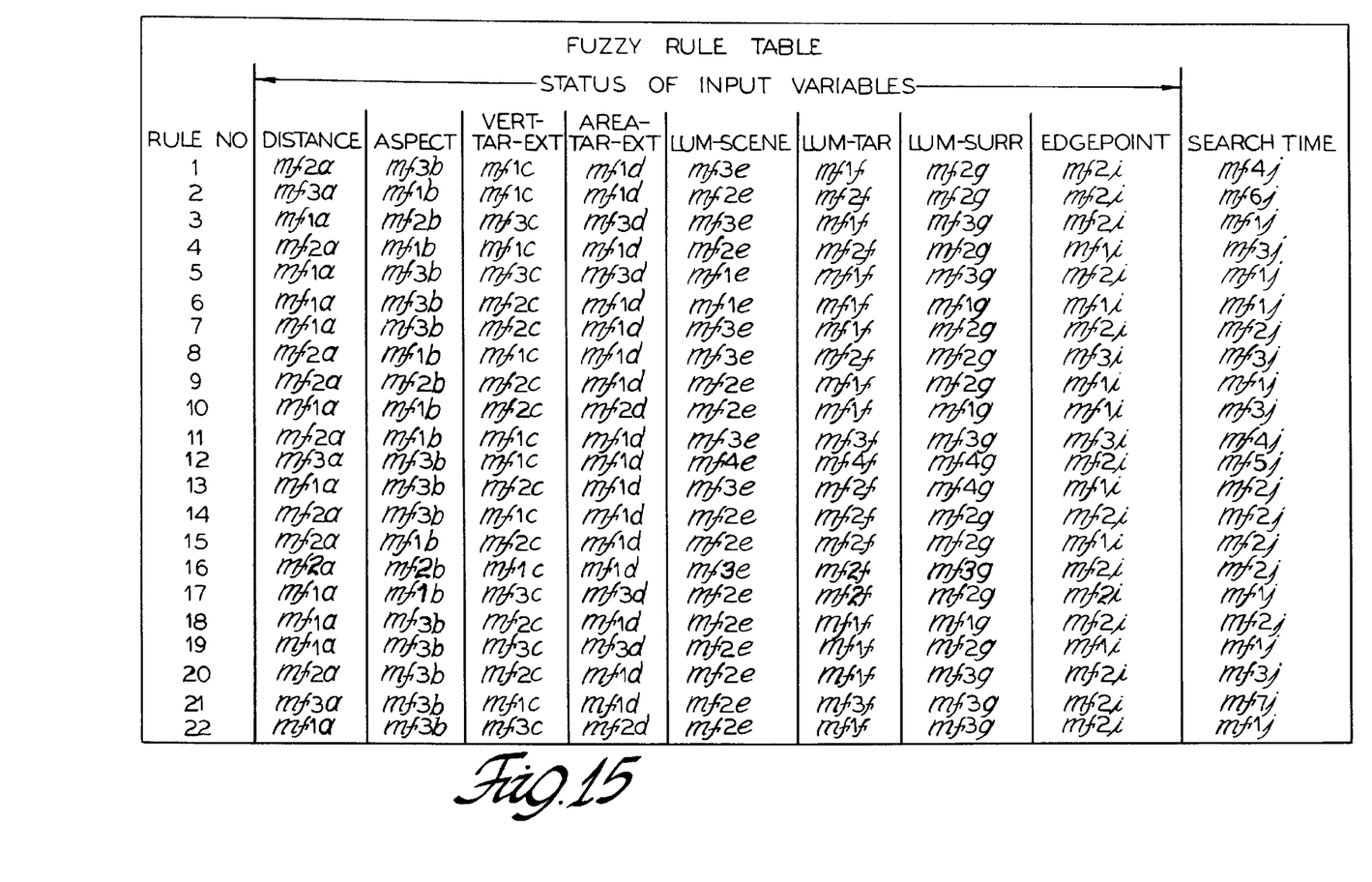
FIG. 15 is a modified table listing the membership functions used for each variable for the fuzzy rules of our method, when "Wavelet edge points" is added as an input variable to our method.

FIG. 12 is a proportionally correct graph of the set of membership functions mf1$i$, mf2$i$ and mf3$i$ associated with the new input variable, which is termed "edge points" in that Figure. The membership functions in FIG. 12 have the same common characteristics as the membership function for the other input variables. Likewise, FIG. 12 utilizes the same vertical scale 8 as do FIGS. 2 through 9. The horizontal scale 6$k$ has a range from 100 to 2000 edge points. FIG. 13 shows a modified set of output variable membership functions (mf1$j$ through mf7$j$) for the output variable, "Search-Time." FIG. 13 is the essentially the same as FIG. 9, but the nonzero portions of the membership functions in the respective figures have somewhat different ranges and the intersections between membership functions occur at different locations. FIG. 15 is a table showing the modified set of fuzzy rules that apply when the edge point variable is included in our method.

Figure 14:
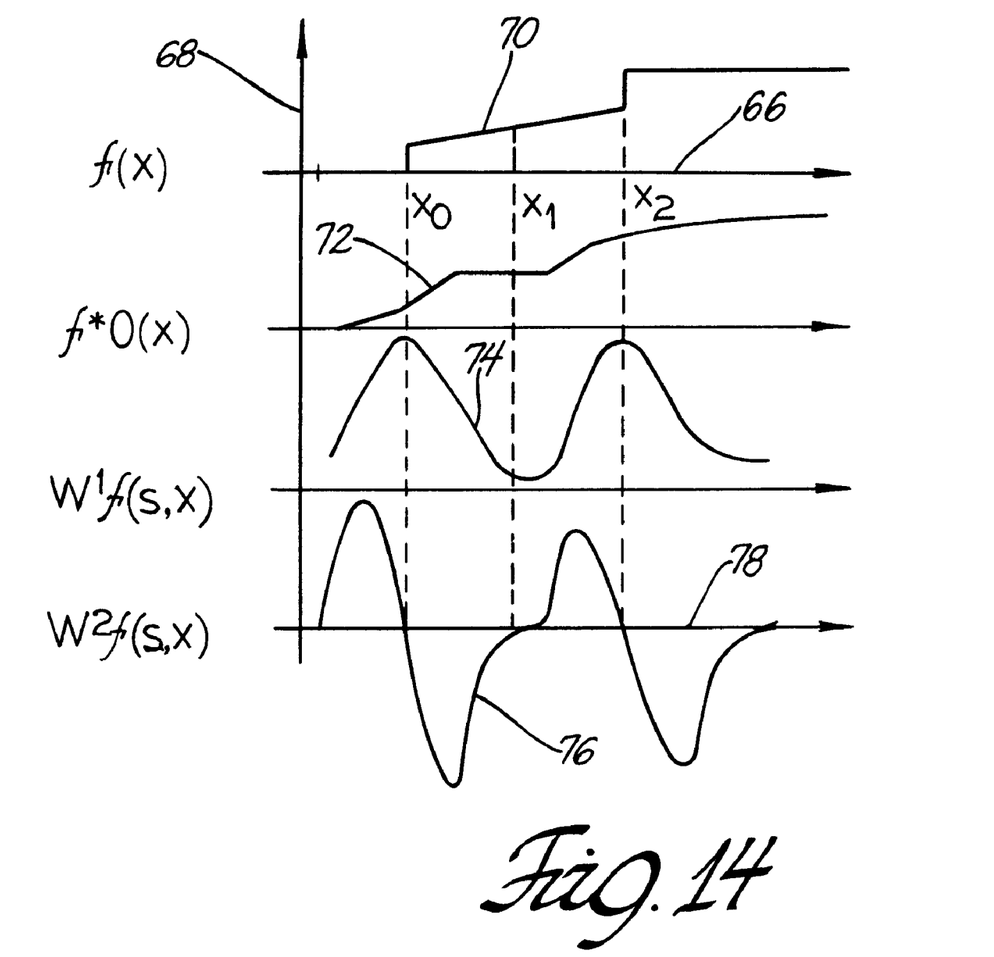
FIG. 14 is a set of graphs representing mathematical functions used to generate the wavelet edge point input variable in the preferred alternate of our method.

FIG. 14 shows the mathematical functions that are used to generate the wavelet edge point input variable in our method. In that Figure, abscissa 66 has thereon the pixel locations for a particular image under consideration, the pixel array dimensions being the same for each image in a set of images being tested. Ordinate 68 represents the range of gray scale values of the images. Line 70 is a continuous linear representation of the function, f(x), wherein gray scale values are associated with pixel location. Line 72 is a graphic representation of $f*\theta(x)$, a wavelet transform of f(x). We prefer a Harr wavelet transform, although other wavelet transforms can be used. Line 74 is a graphic representation of the first derivative of $f*\theta(x)$, which is $W^1f(s,x)$ while line 76 is a graphic representation of the second derivative $f*\theta(x)$, which is $W^2f(s,x)$. Here the variable "s" is the resolution scale, i.e.,. the spatial resolution of the wavelet transform. Generally, low resolution means a low pass filter operation so that the images would look blurry like weather map pictures. High resolution refers to picking out the highest frequency components, like edges, with a high spatial filter. Edges are counted, and thus a value for the wavelet edge point input variable is generated, in either of two ways. One way is to count the extreme highs and lows of $W^1f(s,x)$ in line 74 and the other way is to count the points where is $W^2f(s,x)$ crosses abscissa 78.

We wish it to be understood that we do not desire to be limited to the exact details of construction or method shown herein since obvious modifications will occur to those skilled in the relevant arts without departing from the spirit and scope of the following claims.

What is claimed is:

1. A method incorporating fuzzy logic techniques to determine the degree of difficulty in finding a target of interest within a scene, wherein the difficulty is measured in terms of an output variable defined as search time, the method comprising:

making a set of images of the scene containing the target:

determining the value of a set of input variables of the scene wherein the input variables include selected variables relating to target size, target juxtaposition relative to a point of view, luminance of the target and luminance of the scene;

creating sets of first membership functions, one of the sets being for each of the input variables, the first membership functions associating the input variables with membership values;

creating a set of second membership functions, the second set being associated with the output variable;

creating a set of fuzzy rules, wherein for every fuzzy rule a particular membership function from each of the sets of membership functions is a selected function, whereby each fuzzy rule is comprised of a group of the selected functions;

after the values of the input variables are determined, then for each fuzzy rule determining the membership values for the selected functions from the first sets, and then determining average membership values for the selected membership functions from the first sets;

using the average membership values and associated selected membership functions from the second set, determine an output value for each fuzzy rule; and using the output values to calculate a crisp value.

2. A method incorporating fuzzy logic techniques to determine the degree of difficulty in finding a target of interest within a scene, comprising:

making a set of images of the scene containing the target:

determining the value of a set of input variables of the scene wherein the input variables include selected variables relating to luminance of the overall scene, target, and vicinity of the target, as well as the juxtaposition, height, area, and distance of the target relative to a point of view within the scene;

creating sets of first membership functions, one of the sets being for each of the input variables, the first membership functions associating the input variables with membership values;

creating a set of second membership functions, the set of second membership functions being associated with the output variable;

creating a set of fuzzy rules, wherein for every fuzzy rule a particular membership function from each of the sets of membership functions is a selected function, whereby each fuzzy rule is comprised of a group of the selected functions;

after the values of the input variables are determined, then for each fuzzy rule determining the membership values for the selected functions from the first sets, and then determining average membership values for the selected membership functions from the first sets;

using the average membership values and associated selected membership functions from the second set, determine an output value for each fuzzy rule;

using the output values to calculate a crisp value; and based on the crisp value, accepting or rejecting the target as a design candidate.

3. A method incorporating fuzzy logic techniques to determine the degree of difficulty in finding a target of interest within a scene, comprising:

making a set of images of the scene containing the target:

determining the value of a set of input variables of the scene wherein the input variables include selected variables relating to target size, target juxtaposition relative to a point of view, luminance of the target and luminance of the scene, and wherein the selected variables specifically include target distance, target aspect, target height, target area, target luminance, overall scene luminance, and luminance of target vicinity;

creating sets of first membership functions, one of the sets being for each of the input variables, the first membership functions associating the input variables with membership values;

wherein the first membership functions correspond to input function graphs on a first two-dimensional coordinate system, one dimension of the first system being membership value and ranging from 0 to 1, and another dimension of the first system being a range of values for one of the input variables, the input function graphs all having trapezoidally shaped portions in parts of the ranges where their membership value is greater than 0, and flat apexes of the trapezoidally shaped portions having the membership value of 1;

creating a set of second membership functions, the second set being associated with the output variable;

wherein the second membership functions correspond to output function graphs on a second two-dimensional coordinate system, one dimension of the second system being membership value and ranging from 0 to 1, and another dimension of the second system being a range of values for the output variable, the output function graphs all having trapezoidally shaped sections in regions of the ranges for the output variable where their membership value is greater than 0, and flat apexes of the trapezoidally shaped portions having the membership value of 1;

creating a set of fuzzy rules, wherein for every fuzzy rule a particular membership function from each of the sets of membership functions is a selected function, whereby each fuzzy rule is comprised of a group of the selected functions;

after the values of the input variables are determined, then for each fuzzy rule determining the membership values for the selected functions from the first sets, and then determining average membership values for the selected membership functions from the first sets;

using the average membership values and associated selected membership functions from the second set, determine an output value for each fuzzy rule; and using the output values to calculate a crisp value.

4. The method of claim 3 wherein:

the input function graphs have intersections with one another, the intersections lying at one end of non-zero segments of the input function graphs;

all points on the non-zero segments have the same membership value; and the input function graphs have other segments between the intersections and the apexes, the other segments and the apexes all having a membership value of 1.

5. The method of claim 3 wherein the set of input variables includes the number wavelet edge points in a scene determined from one or more derivatives of a wavelet transform of a function associating pixel location with gray scale value in the images.

* * * * *